US011252173B2

(12) United States Patent
Metzger et al.

(10) Patent No.: US 11,252,173 B2
(45) Date of Patent: Feb. 15, 2022

(54) CYBERSECURITY PENETRATION TEST PLATFORM

(71) Applicant: Keysight Technologies, Inc., Santa Rosa, CA (US)

(72) Inventors: Michael Metzger, Nagold (DE); Thomas Leifert, Herrenberg (DE); Stephen Lee McGregory, Austin, TX (US); Dean Lee, Huntington Beach, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 382 days.

(21) Appl. No.: 16/455,987

(22) Filed: Jun. 28, 2019

(65) Prior Publication Data

US 2020/0412759 A1    Dec. 31, 2020

(51) Int. Cl.
*H04L 29/06* (2006.01)
(52) U.S. Cl.
CPC ...... *H04L 63/1433* (2013.01); *H04L 63/1416* (2013.01); *H04L 63/1441* (2013.01); *H04L 63/20* (2013.01)
(58) Field of Classification Search
None
See application file for complete search history.

(56) References Cited

U.S. PATENT DOCUMENTS

| 10,038,711 B1* | 7/2018 | Gorodissky | H04L 63/30 |
| 10,469,521 B1* | 11/2019 | Segal | H04L 63/20 |
| 2007/0142030 A1* | 6/2007 | Sinha | H04L 63/1433 455/410 |
| 2016/0285907 A1* | 9/2016 | Nguyen | B64F 5/60 |
| 2017/0126731 A1* | 5/2017 | Vallone | H04L 63/1433 |
| 2017/0331847 A1* | 11/2017 | Alexander | H04L 63/1408 |
| 2019/0109872 A1* | 4/2019 | Dhakshinamoorthy | H04L 67/12 |
| 2019/0258805 A1* | 8/2019 | Elovici | G06F 21/577 |
| 2020/0045073 A1* | 2/2020 | Ekambaram | G06F 1/28 |

FOREIGN PATENT DOCUMENTS

| CN | 107426227 A | 12/2017 |
| CN | 109145579 A | 1/2019 |
| JP | 2015114833 A | 6/2015 |

OTHER PUBLICATIONS

German Office Action dated Mar. 2, 2020, pp. 1-12.
Google Translation of German Office Action, pp. 1-12.
(Continued)

*Primary Examiner* — Joseph P Hirl
*Assistant Examiner* — Hassan Saadoun

(57) ABSTRACT

A method, system and non-transitory computer-readable medium used for testing a plurality of circuits to determine open surfaces are disclosed. The method includes: receiving one or more of attack techniques, and known open surfaces; carrying out attacks on a circuit to determine vulnerable surfaces of the circuit; determining when new open surfaces exist in the circuit; updating an attack plan based on the new open surfaces; carrying out the attack plan; generating a report of the open and vulnerable surfaces; and updating a repository to include new attack techniques against newly discovered open surfaces of the circuit.

20 Claims, 5 Drawing Sheets

(56) References Cited

OTHER PUBLICATIONS

Felderer, Michael et al. "Security Testing: A Survey", Advances in Computers, vol. 101, 2016, pp. 1-44.

Mahmoodi, Yasamin et al. "Attack Surface Modeling and Assessment for Penetration testing of IoT system designs", 2018 21st Euromicro Conference on Digital System Design (DSD). IEEE, 2018. pp. 177-181.

Jaks, Liis, "Security evaluation of the electronic control unit software update process", Stockholm (Sweden): KTH Royal Institute of Technology in Stockholm, School of Information and Communication Technology. Master thesis, 2014, pp. 1-94.

Checkoway, Stephen et al., Comprehensive experimental analyzes of automotive attack surfaces:, USENIX Security Symposium, 2011. pp. 447-462.

Ray, Sandip et al. "System-on-chip platform security assurance: Architecture and validation", Proceedings of the IEEE, vol. 106, 2017, No. 1, pp. 21-37.

English translation of CN10914557, 5 pgs.
English translation of CN107426227, 18 pgs.
English translation of JP2015114833, 12 pgs.

* cited by examiner

CYBERSECURITY PENETRATION TEST PLATFORM

BACKGROUND

Many modern equipment are configured to be connected to the Internet and the surrounding infrastructure. For example, modern automobiles, trains, planes, farm equipment and drones include a rolling computer cluster with a variety of wired and wireless interfaces that enable the function of many different systems.

Each of these systems has one or more interfaces to the Internet or other networks, and thus are potentially vulnerable to attacks on the open surfaces. This makes such equipment prime for cyber-attacks, which can result in stolen data from the various components of the equipment, as well as malfunctioning of systems in the equipment.

Just by way of example, although the automotive industry attempts to protect components (e.g., electronic control units (ECUs) and telematics control units (TCUs)) from cyber-attacks, it is necessary to validate that these techniques are effective to avoid cyber-attacks. For example, automobile manufacturers need to validate that their implementation of various components that include hardware, firmware and software in the various ECUs and TCUs are safe from cyber-attacks.

What is needed, therefore, is a system for testing components that are vulnerable to exploits and attacks.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
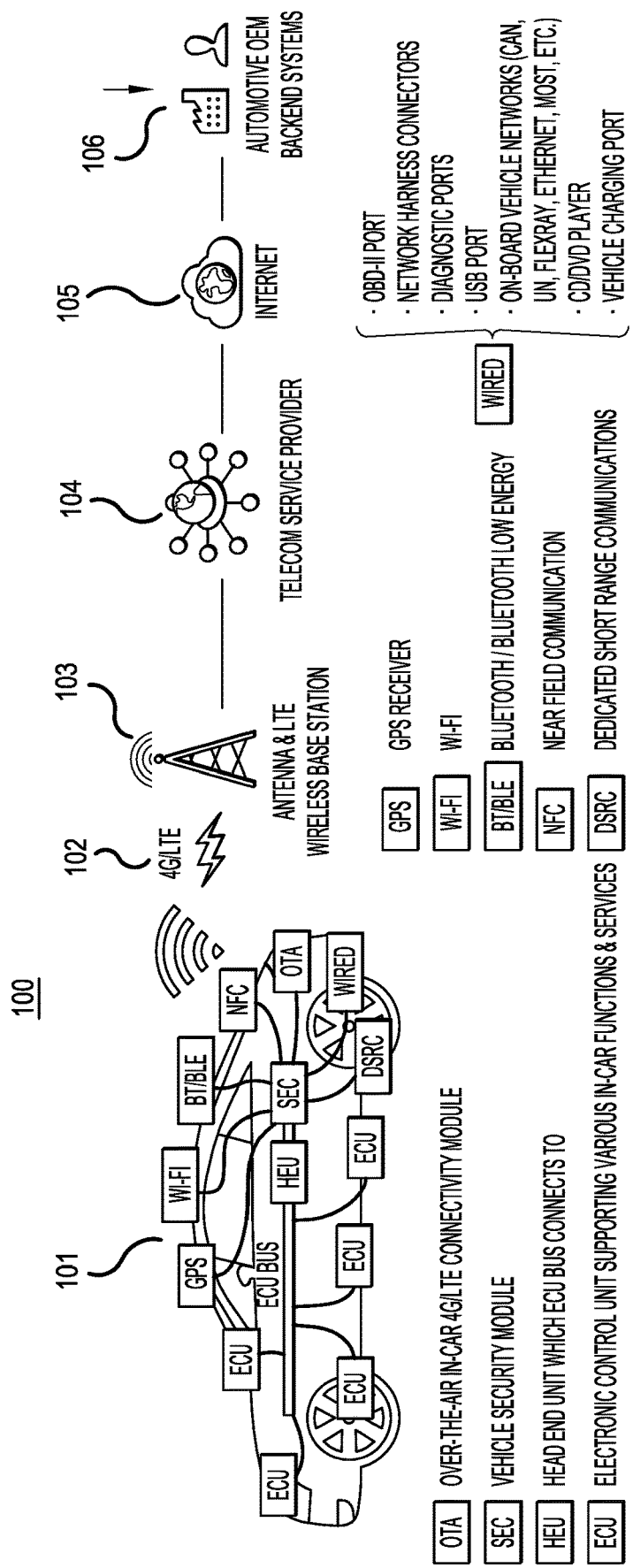
FIG. 1 is a simplified block diagram showing an automobile and its sources of connectivity with various types of communication systems.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms "a", "an" and "the" are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", or "coupled to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As used herein, an "open surface" is a point where an unauthorized user (the "attacker") can try to enter data to or extract data from an environment. As described more fully herein, an open surface is identified after a discovery or reconnaissance process.

As used herein, an "attack surface" is a sum of all open surfaces.

As used herein, a "vulnerable surface" is an open surface that has been breached by the system and methods of the present teachings.

Various embodiments of the present disclosure provide systems, methods, and apparatuses for carrying out cyber-security penetration testing to determine whether components of a system have open surfaces, which are vulnerable to cyber-attacks. By the present teachings, a component is first subject to an attack plan to determine if it is vulnerable to a new attack (i.e., if there are any open surfaces). Depending on the results of the attack plan, the attack plan may be updated to include newly discovered open surfaces. After the attack plan is completed, an attack is carried out on the component, and because of the updating of the attack plan, a regression test is carried out. A report of findings of the attack is made. Based on the report, measures can be taken to eliminate the vulnerable surfaces of the component. Notably, based on the report, a database is updated to include any vulnerable surfaces or open surfaces in the component. This database is continually updated so further attacks include the most up-to-date knowledge of vulnerabilities and exploits.

In accordance with a representative embodiment, a method of testing a plurality of circuits to determine open surfaces is disclosed. The method comprises: receiving one or more of attack techniques, and known open surfaces; carrying out attacks on a circuit to determine vulnerable surfaces of the circuit; determining when new open surfaces exist in the circuit; updating an attack plan based on the new open surfaces; carrying out the attack plan; generating a report of the open and vulnerable surfaces; and updating a repository to include new attack techniques against newly discovered open surfaces of the circuit.

In accordance with another representative embodiment, system for testing a plurality of components to determine open surfaces is disclosed. The system comprises: a test automation platform, comprising: a memory that stores executable instructions; and a processor configured to execute the instructions retrieved from the memory. When executed by the processor, the instructions cause the processor to: receive one or more of attack techniques, known open surfaces; carry out attacks on a circuit to determine vulnerable surfaces of the circuit; determine when new open surfaces exist in the circuit; update an attack plan based on the new open surfaces; carry out the attack plan; generate a report of the open and vulnerable surfaces; and update a repository to include new attack techniques against the newly discovered open surfaces for the circuit.

A non-transitory computer-readable storage medium that stores machine executable instructions executable on a processor, which when executed by the processor cause the processor to perform a method, comprising: receiving one or more of attack techniques, and known open surfaces; carrying out attacks on a circuit to determine vulnerable surfaces of the circuit; determining when new open surfaces exist in the circuit; updating an attack plan based on the new open surfaces; carrying out the attack plan; generating a report of the open and vulnerable surfaces; and updating a repository to include new attack techniques against newly discovered open surfaces of the circuit.

FIG. 1 shows a simplified block diagram showing a communications system 100, that includes an automobile 101 and its sources of connectivity with various types of communication systems. By way of illustration only, it is noted that the automobile may be connected to a base station 103 via a wireless link 102. The wireless link is illustratively a Long Term Evolution (LTE) 4G link, although other communication protocols are contemplated. The base station is connected to service provider 104, which in turn is connected to the internet 105. An automotive OEM backend system 106, which comprises the automotive manufacturer's data center. The OEM backend system collects telematics and has interactions with the automobile from the data center.

Within the communications system is automobile 101. It is noted that the testing of the various components of automobile 101 is merely illustrative, and other equipment is contemplated for testing according to the present teachings. More generally, the present teachings contemplate many types of apparatuses that include components that are susceptible to cyberattack through either attack surfaces or open surfaces as discussed below. By way of illustration, and by no means limitation, instead of, or in addition to, automobile 101, the communications system 100 may include a plane, a train, a bus, a boat, or a ship. Even more generally, the present teachings are adaptable to components of the so-called internet of things (IoT). These and other similar apparatuses and equipment each have many components that are susceptible to cyberattack through either attack surfaces or open surfaces. By the present teachings testing by a continually updated attack plan may be carried out to allow appropriate measures to be made before an attack is launched.

Notably, connections within the automobile 101 or to the automobile 101 may be made using wired protocols. A non-limiting list of these types of wired connections and their associated protocols are shown in FIG. 1.

As will be appreciated, whether through a wireless connection or a wired connection to the automobile 101, cyber-attacks, including open surfaces of various components of the automobile, may be generated, with new attacks occurring with alarming frequency.

As shown in FIG. 1, automobile 101 includes a plurality of components, any of which is susceptible to cyber-attack. These components include hardware, software, firmware and/or combinations thereof, and are generically referred to herein as either components or circuits. As shown in FIG. 1, the automobile 101 may include a number of ECUs and TCUs. Each ECU and TCU comprises a microprocessor, and memory, which comprises code/instructions executable by the microprocessor, and stored data.

The automobile 101 may include components/circuits, such as an over-the-air in-car 4G/LTE connectivity component (OTA), a vehicle security component (SEC), a head end unit to which an ECU bus connects (HEU), a global positioning receiver (GPS), a wireless fidelity (Wi-Fi) component under IEEE 802.11x, a Bluetooth/Bluetooth low energy (BT/BTLE) connection component under IEEE 802.15x, a near-field communication component (NFC) and a dedicated short range communications component (DSRC). Each of these components may include a memory (not shown) comprising one or more modules, each of which comprises a set of related processor executable instructions corresponding to a particular function of the components.

As will be appreciated, each of these components of the automobile 101 is susceptible to cyberattack due to the existence of open surfaces. The method, system and non-transitory computer-readable medium of the present teachings allow the determination of such points of vulnerability in the components of the automobile 101 to allow for action to be taken to prevent a cyberattack at an attack surface, or data manipulation or data theft at an open surface. Beneficially, in accordance with various representative embodiments, the attack plans are continuously updated allowing for new additional testing of the components in ways described herein. Notably, the present teachings also contemplate a regression test, which is a repeat of previous test. The update attack plans include newly discovered attack techniques, which are additional, build up larger test suite, and after having been run once they will be used later for a regression test.

Figure 2:
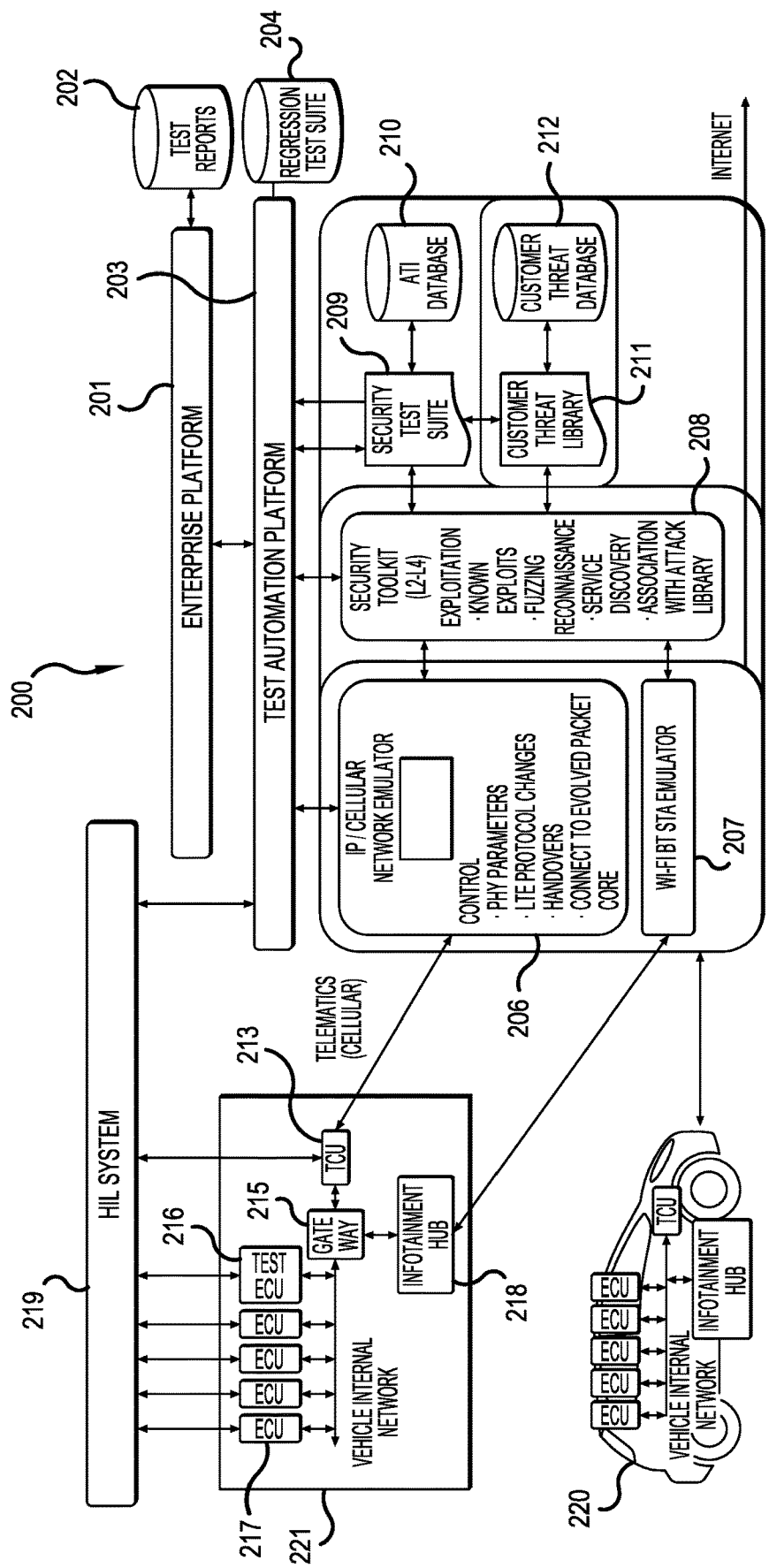
FIG. 2 is a simplified block diagram showing a test system configured to identify open surfaces in components in an automobile, in accordance with a representative embodiment.

FIG. 2 is a simplified block diagram showing a test system 200 configured to identify open surfaces in components in an automobile, in accordance with a representative embodiment. Certain aspects of the communications system 100 described in connection with FIG. 1 may be common to aspects of the test system 200, and are not necessarily repeated.

The test system 200 comprises an enterprise platform 201, which comprises a memory of test reports 202. Generally, the enterprise platform 201 coordinates the sequential testing of components under test by the test system 200.

The test system further comprises a test automation platform (TAP) 203. The TAP 203 comprises regression test suite 204 stored in its memory. As described more fully below, the TAP 203 comprises a processor (not shown in FIG. 2) and a memory that comprises computer code/instructions, which when executed by the processor, executes all connectivity between various hardware components of the test system 200. These codes include but are not limited to protocol specific libraries that allow the connection of different layers of the test system 200.

In an illustrative embodiment, the enterprise platform comprises code/instructions stored in memory that may be run on a processor in the enterprise platform, or on the processor for the TAP 203. In a large enterprise there may be a plurality of TAPs (not shown) used for component testing, since there are different sources of components under test. For example, in representative embodiments directed to testing of an automobile, ECU testing using the plurality of TAPs since ECUs are developed for disparate functions of the automobile (e.g., engine control, assisted driving, body & chassis, etc.), and one enterprise platform consolidating testing results for each TAP. This enterprise platform visualizes the layout (network) of all ECUs of a car, and it visualizes the results of the individual ECU testing. So the enterprise platform accesses the results of the individual results for each ECU (that have been executed by one of the plurality of TAPs) by connecting to the individual TAP databases over the customer's network infrastructure.

The test system 200 further comprises an IP/cellular network emulator (network emulator) 206 and a Wi-Fi blue tooth station emulator (station emulator) 207. As described more fully herein, the emulator 206, and the station emulator comprises hardware and software that enables communications to the components under test. The emulator 206 comprises hardware components (e.g., a network emulator, a Wi-Fi blue tooth station emulator), that are protocol specific connectivity gateways. These components provide the hardware HW interface that connects to the specific interfaces in the device under test (DUT). As such, one end of the gateway is protocol specific (connected towards the DUT), and the other end is generic (e.g., a TCP/IP interface, using an RJ45 connector) that connects to the computer that executes the attacks.

The test system 200 further comprises a security toolkit (toolkit) 208. The security toolkit 208 may include one or more machine-readable non-transitory storage media such as read-only memory (ROM), random-access memory (RAM), magnetic disk storage media, optical storage media, flash-memory devices, or similar storage media. In various embodiments, the security toolkit 208 stores code/instructions in the memory for execution by the processor of the TAP 203. The security toolkit 208 is an execution engine, which is run by the processor of the TAP 203, and which executes various attacks based on code/instructions stored in a security test suite (test suite) 209, and an Application and Threat Intelligence database 210.

The Application and Threat Intelligence database 210 is a security intelligent data base service that includes a repository of known signatures/details of malware and vulnerability so the security toolkit 208 can execute attacks to determine open surfaces of the components under test. The Application and Threat Intelligence database contains the definitions of such vulnerabilities (at a meta data level, high-level description of the vulnerabilities). On the other hand, the security test suite 209 comprises code/instructions that are executed by the security toolkit 208 on the processor. More generally, the test suite comprises attack plans, which are discussed more fully below, that are specific to the component(s) being tested.

As the tests are run on components under test by the test system 200, signatures/details of malware and vulnerability stored in the Application and Threat Intelligence database 210 and the security test suite 209 are executed by the security toolkit 208 to discover open surfaces on the component under test. Moreover, for newly discovered open surfaces, new test cases will be added to the regression test suite and executed against the open surfaces during execution of the test system 200. Notably a test case is executed on a DUT (e.g., ECU, TCU) and ends with a result. An attack is a type of test case; and there are also scanning or reconnaissance type of test cases.

Moreover, the new test cases will be executed and added to the regression test suite 204 upon discovery of any new attack or open surfaces during execution of the test system 200.

Illustratively, the Application and Threat Intelligence database 210 may include one or more machine-readable non-transitory storage media such as read-only memory (ROM), random-access memory (RAM), magnetic disk storage media, optical storage media, flash-memory devices, or similar storage media. In various embodiments, the Application and Threat Intelligence database 210 may store instructions for execution by the processor provided in the TAP 203 or data upon with the processor may operate (alone or in conjunction with the security toolkit 208 and the security test suite 209).

As shown in FIG. 2, the test system 200 also comprises a Hardware in the Loop (HIL) 219. The HIL 219 is a commercial system that allows the ECU's and TCU's to operate outside a vehicle. The HIL 219 system can be configured and controlled by the TAP 203, and thus enables the user to automate the process of running attacks against the respective DUTs.

The test system 200 is configured to launch attacks through a TCU 213 and a gateway 215 to a test ECU 216 of a vehicle internal network 221. These test system 200 is also configured to launch attacks through the station emulator 207 via a network access device (NAD).

The vehicle internal network 221 is a network of components (e.g., ECUs) found in a vehicle at the site of manufacture. By carrying out the attacks on the vehicle internal network 221, open surfaces on the test ECU (or other component) are identified and curative measures can be taken.

As shown in FIG. 2, the test system 200 of the present teachings is contemplated for use with an automobile 220 after completion of production or during routine servicing. As such, by the present teachings, vehicle network interfaces can be tested prior to use in the automobile 220, and after the automobile has entered service. As alluded above, and as described more fully below, the test system of the present teachings is configured to be continually updated with the latest signatures/details of malware and vulnerability, so that attacks made by the test system 200 on the components under test can be updated regularly to identify and discover open surfaces on the components so curative action may be taken.

Figure 3:
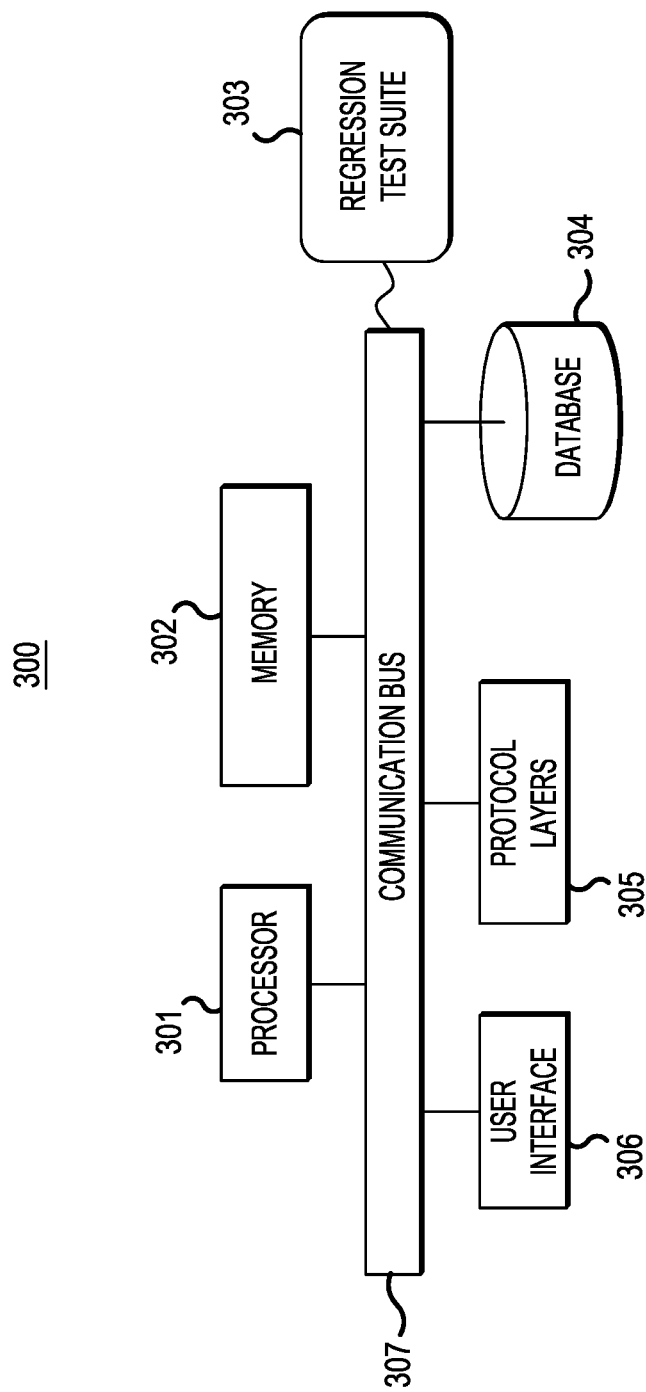
FIG. 3 is a simplified block diagram of a test automation platform in accordance with a representative embodiment.

FIG. 3 is a simplified block diagram of a test automation platform (TAP) 300 in accordance with a representative embodiment. The test automation platform 300 may be implemented as the TAP 203 in the test system 200 described in connection with FIG. 2. Certain aspects of the TAP 300 described in connection with FIGS. 1 and 2 may be common to aspects of the TAP 300, and are not necessarily repeated.

The TAP 300 comprises a processor 301, a memory 302, which stores an attack currently in progress, and a regression test suite 303. The processor 301 is adapted to execute code/instructions saved in a database 304 via protocol layers 305, and a user interface. The test automation platform 300 communicates with various components using a communications bus 307.

In accordance with a representative embodiment, the database 304 comprises the security toolkit 208, the security test suite 209, the Application and Threat Intelligence database 210, the customer threat library 211 and customer threat database 212. As noted above, tests are run on components under test by the test system 200, and signatures/details of malware and vulnerability stored in the database 304 (e.g. Application and Threat Intelligence database 210 and the security test suite 209) are executed by the processor 301 using the software of the security toolkit 208 to discover open surfaces on the component under test.

The processor 301 may be any hardware device capable of executing instructions stored in memory 302 and the database 304, and otherwise processing raw data. The processor 301 may execute the instructions to implement part or all of methods described herein. Additionally, the processor 301 may be distributed among multiple devices, e.g., to accommodate methods necessarily implemented in a distributed manner that requires multiples sets of memory/processor combinations.

The processor 301 is tangible and non-transitory, and is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A processor is an article of manufacture and/or a machine component. The processor 301 of the TAP 300 is configured to execute software instructions to perform functions as described in the various embodiments herein. The processor 301 may be a general-purpose processor or may be part of an application specific integrated circuit (ASIC). The processor 301 may also be (or include) a microprocessor, a microcomputer, a processor chip, a controller, a microcontroller, a digital signal processor (DSP), a state machine, or a programmable logic device. The processor 301 may also be (or include) a logical circuit, including a programmable gate array (PGA) such as a field programmable gate array (FPGA), or another type of circuit that includes discrete gate and/or transistor logic. The processor 301 may be a central processing unit (CPU), a graphics processing unit (GPU), or both. Additionally, any processor described herein may include multiple processors, parallel processors, or both. Multiple processors may be included in, or coupled to, a single device or multiple devices.

The memory 302 and the database 304 may include various memories such as, for example, cache or system memory. As such, the memory 302, the regression test suite 303, and the database 304 each may include static random-access memory (SRAM), dynamic RAM (DRAM), flash memory, read only memory (ROM), or other similar memory devices, as discussed below with above in connection with the test system 200, and below. It will be apparent that, in embodiments where the processor includes one or more ASICs (or other processing devices) that implement one or more of the functions described herein in hardware, the software described as corresponding to such functionality in other embodiments may be omitted. That is, the memory 302, the regression test suite 303, and the database 304 may each store instructions for execution by the processor 301 and/or data upon which the processor 301 may operate.

The memory 302 may include various modules, each of which comprises a set of related processor executable instructions corresponding to a particular function of the TAP 300.

The database 304 may include one or more machine-readable non-transitory storage media such as read-only memory (ROM), random-access memory (RAM), magnetic disk storage media, optical storage media, flash-memory devices, or similar storage media. In various embodiments, the database 304 may store instructions for execution by the processor 301 or data upon with the processor 301 may operate (alone or in conjunction with the memory 302 and regression test suite 303).

The user interface 306 may include one or more devices for enabling communication with a user. The user interface 306 comprises Graphical User Interface (GUI) and Application Programming Interface (API). The GUI allows users to interact with TAP 300 via graphical representation of system configuration and setting. The API allows user to interact with TAP 300 via a set of programmable commands. As such, the API provides a programming interface to allow users to integrate the solution into their own environment, and also to allow the integration of customer specific attacks and threat libraries. The interface may also be used to extend the system for future protocols, both wired and wireless.

The protocol layers 305 are disposed in the IP/cellular network emulator (network emulator) 206 and Wi-Fi blue tooth station emulator (station emulator) 207. Notably these protocols are merely illustrative, and other communications protocols within the purview of the ordinarily skilled artisan are contemplated. As described more fully herein, the protocol layers 305 of the emulator 206, and the station emulator 207 comprise hardware and software that enables communications to the components under test, and enable communications between the TAP 203, the database 304 and the components under test.

Figure 4:
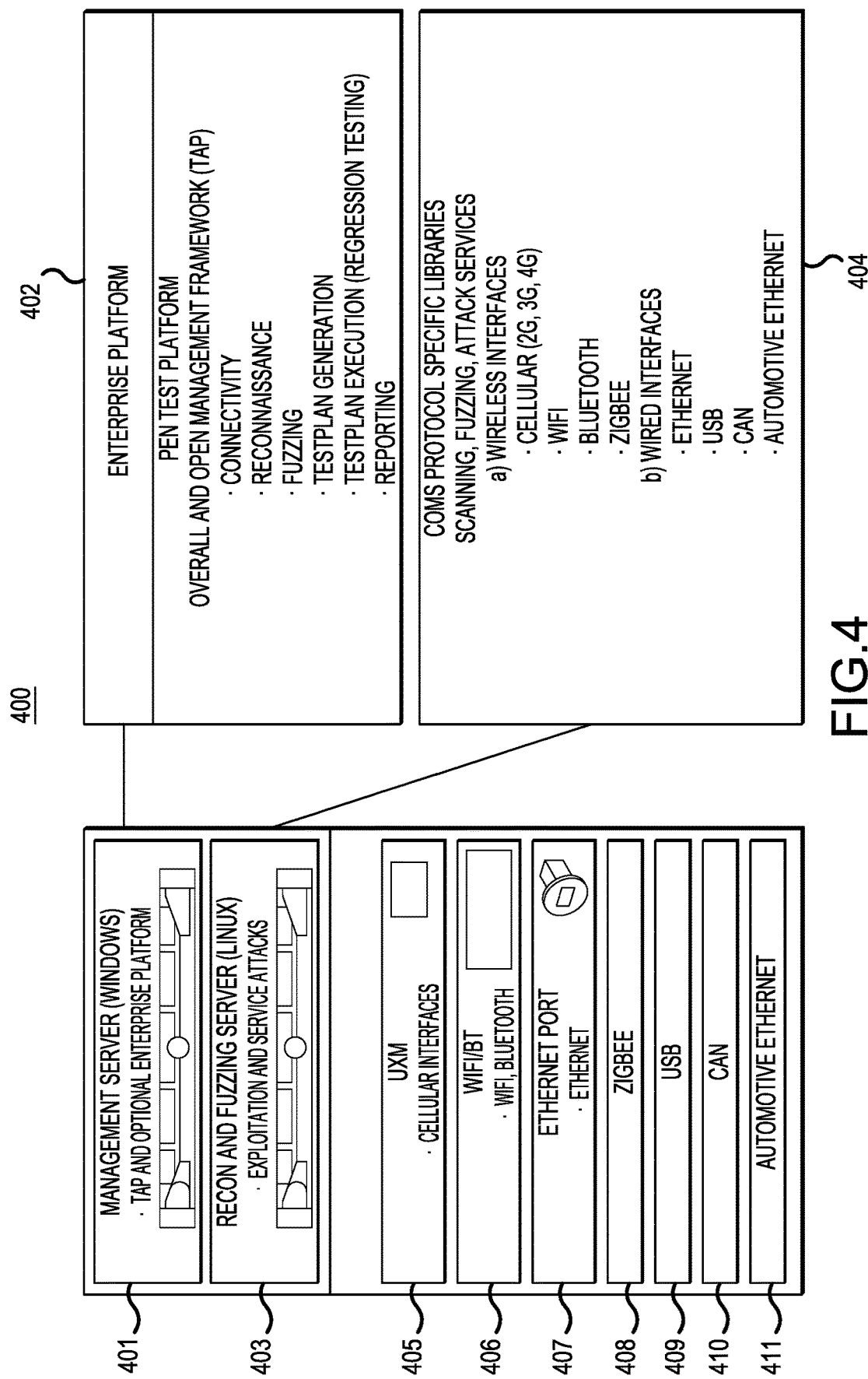
FIG. 4 is a simplified block diagram of various aspects of the test system of FIG. 2, in accordance with a representative embodiment.

FIG. 4 is a simplified block diagram a test system 400, in accordance with a representative embodiment. Certain aspects of the test system 400 described in connection with FIGS. 1-3 may be common to aspects of the test system 400, and are not necessarily repeated.

The test system 400 comprises a management server 401, which illustratively comprises a TAP, and an optional Enterprise Platform as shown. The various functions of the management server 401 are shown in an enterprise and penetration test platform 402, and are discussed below. The test system also comprises a reconnaissance and fuzzing (RF) server 403. The various functions of the RF server 403 are shown in a communications protocol specific library 404 and are discussed below.

The test system further comprises a hardware gateway for connection to components under test, such as shown in FIGS. 1 and 2. The hardware gateway illustratively includes a cellular interface 405, a Wi-Fi-BT interface 406, an Ethernet port interface 407, a Zigbee interface 408, a universal serial bus interface 409, a controller area network 410 and an automotive Ethernet interface 411. It is emphasized that the various interfaces of the hardware are merely illustrative, and more or fewer interfaces are contemplated. More generally, the interfaces contemplated are task-specific, with each interface being provided to effect communications using a desired protocol.

Enterprise and penetration (PEN) test platform 402 are an illustrative representation of the various components of the management server 401. These components include, but are not limited to the TAP, such as described above in connection with FIGS. 2 and 3. Notably, the enterprise and penetration test platform 402 includes the processor described above in connection with FIG. 3. Among other functions the TAP effects connectivity between various components, and executes code/instructions stored in the security toolkit discussed above. More generally, enterprise and penetration test platform 402 of the management server 401 provides the overall and open management frame work, and effects connectivity, reconnaissance (also referred to herein as 'discovery'), fuzzing, test plan generation, test plan execution and reporting.

The communications protocol specific library 404 is an illustrative representation of the various components of the RF server 403. The communications protocol specific library 404 comprises various protocol specific libraries, and includes, for example the security toolkit, the security test suite, the Application and Threat Intelligence database, and may include the customer threat library and the customer threat database discussed above in connection with the representative embodiments of FIG. 2. The communications protocol specific library 404 provides scanning, fuzzing and attack that are executed by the processor of the TAP. These functions are run by the various hardware gateway devices used for connection to components under test.

The PEN Test platform 402 automates to a maximum extent the process of exploring vulnerabilities through the different attack surfaces of the DUT. By their nature, some elements of the exploitation process will remain a manual process (such as establishing connectivity), whereas the majority of the labor intense work is executed in an automated fashion (e.g. exploitation). Results of these activities are provided by automated reporting.

Figure 5:
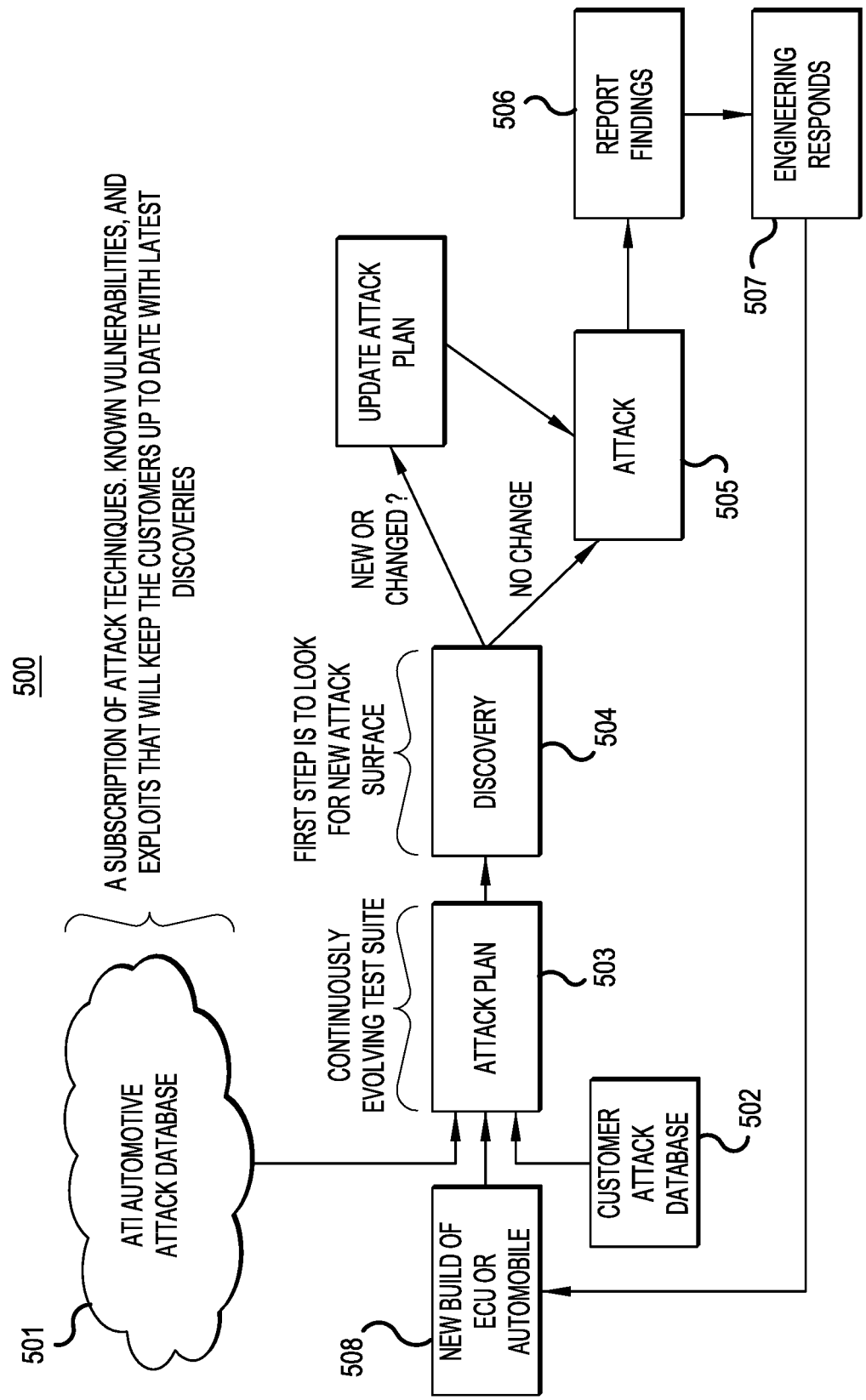
FIG. 5 illustrates a simplified flow diagram of a method of testing equipment to identify open surfaces in components in an automobile, in accordance with a representative embodiment.

FIG. 5 is a flowchart showing a process 500 for performing a test on a component in accordance with a representative embodiment. Certain aspects of the process 500 are common to those described in the representative embodiments described in connection with FIGS. 1-4. Many common aspects of the process 500, and are not necessarily repeated.

An Application and Threat Intelligence automotive attack database 501 is provided for the process 500. The Application and Threat Intelligence automotive attack database comprises, for example, the security test suite and Application and Threat Intelligence database described above. Notably, the Application and Threat Intelligence automotive attack database 501 is updated through reports provided by the process 500, as well as through the retrieval of signatures/details of malware and vulnerability from external sources (not shown).

Optionally, a customer attack database 502 is provided for the process 500. The customer attack database 502 comprises, for example, the customer threat library and the customer threat database described above. Notably, the customer attack database 502 can be updated by the customer through the retrieval of signatures/details of malware and vulnerability from various sources (not shown). Notably, users can create and update the customer attack database 502 via authoring and automation script.

Data and code/instructions from the Application and Threat Intelligence automotive attack database 501 and, optionally from the customer attack database 502, form an attack plan 503. Generally, the attack plan 503 is executed by the security tool kit, such as described above. The process 500 also provides a discovery sequence 504. The discovery sequence 504 does initial testing on the component under test to determine if there are attack surfaces, or open surfaces, or both, not listed in the attack plan 503.

The discovery sequence 504 (also referred to as reconnaissance) uses methods provided by each of the connectivity bridge protocols that disclose information about open surfaces. These open surfaces are queried, and if responsive, are investigated to determine when the service on an open port is known. A service is usually a process with a purpose to support the system, like a web service which delivers web pages. Just by way of example, IP port scanning is an illustrative method to query any open ports of the system. If an open port is identified, then exploitation services in accordance with the present teachings and specific to that port will be executed.

When no new attack surfaces or open surfaces are discovered in the discovery sequence 504, the process 500 proceeds to the attack 505, which comprises the execution by the toolkit of the security test suite as described above. After completion of the attack 505, report finding 506 is generated, and engineering responds at step 507 to remedy any attack surfaces or open surfaces found during the attack 505.

When new attack surfaces or open surfaces are discovered in the discovery sequence 504, the process 500 proceeds to update the attack plan. After completion of the attack 505, report finding 506 is generated, and engineering responds at step 507 to remedy any attack surfaces or open surfaces found during the attack 505. Notably, the report that includes the newly discovered attack surfaces, or open surfaces, or both is provided to the Application and Threat Intelligence automotive attack database 501, and then to the attack plan 503. The new attacks uncovered are stored in the regression test suite described above.

Finally, the process continues with a new build 508 of a component (e.g., ECU or automobile comprising many components) for testing.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described above, the present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present.

The foregoing description, along with its associated embodiments, has been presented for purposes of illustration only. It is not exhaustive and does not limit the concepts disclosed herein to their precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise, various steps may be omitted, repeated, or combined, as necessary, to achieve the same or similar objectives. Accordingly, the present disclosure is not limited to the above-described embodiments, but instead is defined by the appended claims in light of their full scope of equivalents.

In the preceding, various representative embodiments have been described with references to the accompanying drawings. It may, however, be evident that various modifications and changes may be made thereto, and additional embodiments may be implemented, without departing from the broader scope of the inventive concepts disclosed herein as set forth in the claims that follow. The specification and drawings are accordingly to be regarded as an illustrative rather than restrictive sense.

Although system and method of testing a plurality of circuits to determine open surfaces and attack surfaces have been described with reference to a number of illustrative embodiments, it is understood that the words that have been used are words of description and illustration, rather than words of limitation. Changes may be made within the purview of the appended claims, as presently stated and as amended, without departing from the scope and spirit of system and method of optimal sensor placement in its aspects. Although system and method of optimal sensor placement has been described with reference to particular means, materials and embodiments, system and method of optimal sensor placement is not intended to be limited to the particulars disclosed; rather system and method of evaluating a subject using a wearable sensor extend to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of testing a plurality of circuits to determine open surfaces, the method comprising:
   receiving one or more of attack techniques, and known open surfaces;
   carrying out attacks on a circuit to determine vulnerable surfaces of the circuit;
   determining when new open surfaces exist in the circuit;
   updating an attack plan based on the new open surfaces;
   carrying out the attack plan; generating a report of the open and vulnerable surfaces; and
   updating a regression test suite to include new attack techniques against newly discovered open surfaces of the circuit.

2. The method of claim 1, further comprising, after carrying out the attacks:
   determining that when no new open surfaces exist in the circuit, not updating the attack plan; and
   carrying out of the attack plan.

3. The method of claim 2, further comprising, after carrying out the attack plan:
   generating a report of the determined open surfaces for the circuit.

4. The method of claim 1, wherein the report comprises newly discovered attack surfaces, or newly determined open surfaces, or both.

5. The method of claim 4, further comprising storing the newly discovered attack surfaces, or the newly discovered open surfaces in the regression test suite.

6. The method of claim 1, further comprising determining when a service on an open port is known; and after the determining when the service on the open surface is known, executing an exploitation service on the open port.

7. A system for testing a plurality of components to determine vulnerability and open surfaces, the system comprising:
   a test automation platform, comprising: a memory that stores executable instructions; and a processor configured to execute the instructions retrieved from the memory, wherein when executed by the processor, the instructions cause the processor to:
   receive one or more of attack techniques, known open surfaces;
   carry out attacks on a circuit to determine vulnerable surfaces of the circuit; determine when new open surfaces exist in the circuit;
   update an attack plan based on the new open surfaces; carry out the attack plan; generate a report of the open and vulnerable surfaces; and
   update a repository to include new attack techniques against discovered new open surfaces for the circuit.

8. The system of claim 7, wherein the memory that stores executable instructions further comprises instructions, when executed, further cause the processor to:
   determine when no new open surfaces exist in the circuit, and not update the attack plan; and
   perform the carry out of the attack plan.

9. The system of claim 7, wherein the memory that stores executable instructions further comprises instructions, when executed, further cause the processor to:
   generate a report of the determined open surfaces for the circuit after the performing of the carry out of the attack plan.

10. The system of claim 7, wherein the memory further comprises:
    a security tool kit;
    a test suite; and
    an attack database.

11. The system of claim 10, wherein the test suite and the attack database comprise at least a portion of the instructions.

12. The system of claim 10, wherein the security tool kit comprises the instructions that carry out the attack plan.

13. The system of claim 10, further comprising an emulator, comprising:
    a plurality of communication layers, each of the communication layers adapted to transmit the attack plan to the circuit based on a protocol specific to the circuits.

14. The system of claim 13, wherein the processor is a first processor, the circuit is a first circuit, and the system further comprises an enterprise platform, comprising:
    a second processor configured to execute the instructions retrieved from the memory, wherein the instructions, when executed, cause the first processor to carry out testing of a second circuit.

15. The system of claim 10, wherein the memory comprises a security test suite and an attack database.

16. The system of claim 10, wherein the memory further comprises a customer threat library and a customer threat database.

17. The system of claim 10, wherein the repository is a regression test suite.

18. A non-transitory computer-readable storage medium that stores machine executable instructions executable on a processor, which when executed by the processor cause the processor to perform a method, the method comprising:
    receiving one or more of attack techniques, and known open surfaces;
    carrying out attacks on a circuit to determine vulnerable surfaces of the circuit;
    determining when new open surfaces exist in the circuit;
    updating an attack plan based on the new open surfaces;
    carrying out the attack plan; generating a report of the open and vulnerable surfaces; and
    updating a regression test suite to include new attack techniques against newly discovered open surfaces of the circuit.

19. The non-transitory computer-readable medium of claim 18, wherein the method further comprises, after carrying out the attacks:
    determining that when no new open surfaces exist in the circuit, not updating the attack plan; and
    carrying out of the attack plan.

20. The non-transitory computer-readable medium of claim 18, wherein the method further comprises, after carrying out the attacks:
    generating a report of the determined open surfaces for the circuit.

* * * * *